US009734846B2

United States Patent
Umeda

(10) Patent No.: US 9,734,846 B2
(45) Date of Patent: Aug. 15, 2017

(54) MAGNETIC RECORDING APPARATUS AND CONTROLLING METHOD OF MAGNETIC RECORDING APPARATUS

(71) Applicant: CANON KABUSHIKI KAISHA, Tokyo (JP)

(72) Inventor: Yoshinobu Umeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/301,999

(22) PCT Filed: Apr. 16, 2015

(86) PCT No.: PCT/JP2015/062318
§ 371 (c)(1),
(2) Date: Oct. 5, 2016

(87) PCT Pub. No.: WO2015/163388
PCT Pub. Date: Oct. 29, 2015

(65) Prior Publication Data
US 2017/0125041 A1    May 4, 2017

(30) Foreign Application Priority Data
Apr. 22, 2014  (JP) .................... 2014-088139

(51) Int. Cl.
*G11B 27/36*  (2006.01)
*G11B 5/09*   (2006.01)
(Continued)

(52) U.S. Cl.
CPC .......... *G11B 5/024* (2013.01); *G11B 20/1217* (2013.01); *G11B 2020/1238* (2013.01)

(58) Field of Classification Search
CPC .......... G11B 5/012; G11B 27/36; G11B 5/02; G11B 2220/90; G11B 15/087;
(Continued)

(56) References Cited

U.S. PATENT DOCUMENTS 9,495,988 B1 * 11/2016 Liu .................. G11B 20/10009
2011/0090583 A1   4/2011 Mutoh ............................ 360/48
(Continued)

FOREIGN PATENT DOCUMENTS

JP     2008-269679 A    11/2008
JP     2011-008881 A    1/2011
(Continued)

OTHER PUBLICATIONS

International Search Report and Written Opinion of the International Authority dated Jul. 21, 2015, issued by WIPO in connection with International Application No. PCT/JP2015/062318.

*Primary Examiner* — Nabil Hindi
(74) *Attorney, Agent, or Firm* — Fitzpatrick, Cella, Harper & Scinto

(57) ABSTRACT

In case of deleting shingle-recorded data on a recording medium, it enables to completely delete the data with the number of writing times less than the number of writing times in data recording. To do so, a magnetic recording apparatus, which records the data on the recording medium in a first direction with a writing unit, controls movement of a relative position of the recording medium and the writing unit such that a quantity of the movement in a second direction perpendicular to the first direction in the data deletion by overwriting another data is larger than a quantity of the movement in the second direction in the data recording.

7 Claims, 12 Drawing Sheets

(51) Int. Cl.
*G11B 5/024* (2006.01)
*G11B 20/12* (2006.01)

(58) Field of Classification Search
CPC .......... G11B 20/1426; G11B 20/10009; G11B 27/3027; G11B 20/1205; G11B 20/18
USPC .................... 360/25, 27, 31, 40, 48, 50, 53; 369/275.3, 47.28
See application file for complete search history.

(56) References Cited

U.S. PATENT DOCUMENTS

| | | | |
|---|---|---|---|
| 2013/0057978 A1 | 3/2013 | Sakai et al. | 360/75 |
| 2013/0083416 A1 | 4/2013 | Kasiraj et al. | 360/39 |
| 2013/0170061 A1 | 7/2013 | Saito et al. | 360/39 |
| 2013/0194699 A1 | 8/2013 | Matsuo et al. | 360/77.08 |

FOREIGN PATENT DOCUMENTS

| | | |
|---|---|---|
| JP | 2013-058271 A | 3/2013 |
| JP | 2013-080552 A | 5/2013 |
| JP | 2013-140661 A | 7/2013 |
| JP | 2013-157067 A | 8/2013 |

\* cited by examiner

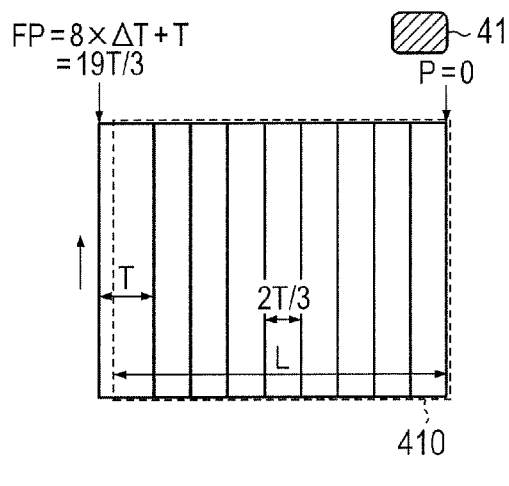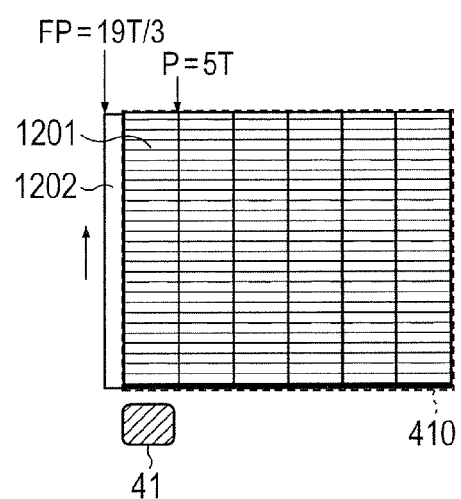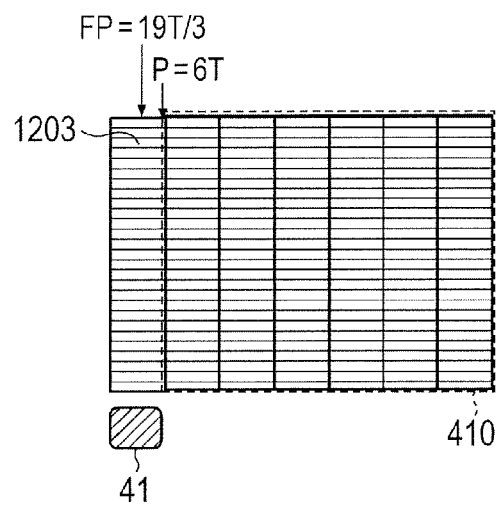

MAGNETIC RECORDING APPARATUS AND CONTROLLING METHOD OF MAGNETIC RECORDING APPARATUS

TECHNICAL FIELD

The present invention relates to a magnetic recording apparatus and a controlling method of the magnetic recording apparatus. More particularly, the present invention relates to a technique which is suitable for a magnetic recording apparatus capable of recording information with high density in a shingle recording method.

BACKGROUND ART

In recent years, quality of image and video becomes high rapidly, and thus the quantity of information to be dealt with by a user increases more and more. For this reason, various techniques for increasing surface recording density are examined and investigated for enlarging the capacity of a magnetic recording apparatus which is called an HDD (hard disk drive). As one of promising techniques for achieving such high-density magnetic recording, there is a shingle recording method as disclosed in PTL 1 which records a recording column such that the recorded recording column partially overlaps a recording column which is adjacent to the recorded recording column in the width direction of a track and was recorded immediately before.

In general, the pitch of a track to be formed on a magnetic recording medium is about several times longer than the length of a formed shortest mark. However, in the shingle recording method, since the recording column is recorded so as to partially overlap the adjacent recording column recorded immediately before, it is possible to shorten the pitch of the finally formed track to the extent of the length of the shortest mark. That is, since the recording is performed such that the recorded recording column partially overlaps the adjacent recording column recorded immediately before, the number of tracks per unit length becomes several times, so that it is possible to highly improve recording density.

Besides, in a case where the data recorded on the HDD is deleted, such deletion is generally performed by using a deleting command, a deleting operation and the like installed in the HOD. However, in such a deleting method, merely the data at the storage position indicated by a file system is deleted. That is, since the data themselves recorded on the magnetic recording medium such as the HDD are not deleted, these data still remain.

For this reason, it is possible to read the deleted data by a method of directly accessing the relevant data on the HDD without using the file system or a method of using a data recovery tool.

Under these circumstances, from a viewpoint of prevention of information leakage, complete deletion to the data remaining on the HDD is performed recently. Here, it should be noted that the complete deletion can be rephrased as a deleting method of deleting the original data from the magnetic recording medium by overwriting meaningless data entirely to the area on the magnetic recording medium at which the original data intended to be deleted have been recorded.

CITATION LIST

Patent Literature

PTL 1: Japanese Patent Application Laid-Open No. 2011-008881

SUMMARY OF INVENTION

Technical Problem

As described above, in the complete deletion, the data intended to be deleted on the magnetic recording medium are deleted by overwriting the meaningless data to the area on the magnetic recording medium at which the relevant data have been written and recorded. At this time, if such data overwriting is performed in the shingle recording method, it is resultingly necessary to perform the data writing (overwriting) multiple times to the same area on the magnetic recording medium. Thus, there is a problem that such redundant writing prolongs operation time.

In view of the above problem, the present invention aims to be able to, in case of deleting the shingle-recorded data on the magnetic recording medium, completely delete the data with the number of writing times less than the number of writing times in the data recording.

Solution to Problem

A magnetic recording apparatus of the present invention is characterized by comprising: a writing unit configured to form a recording column extending in a first direction, by applying a recording magnetic field to a recording medium; a moving unit configured to move a relative position of the recording medium and the writing unit to a second direction perpendicular to the first direction; and a controlling unit configured to control the writing unit and the moving unit such that, on the recording medium, the recording columns mutually adjacent in regard to the second direction partially overlap in the second direction, wherein the controlling unit controls the moving unit such that a quantity of the movement in the second direction in case of deleting information written on the recording medium by overwriting with the writing unit another information on the recording column in which the information has been written is larger than a quantity of the movement in the second direction in case of writing information on the recording medium with the writing unit.

Advantageous Effects of Invention

According to the present invention, in case of completely deleting the data, the writing of the data is performed by controlling the quantity of the movement of the writing unit so as to become smaller than the quantity of the movement of the writing unit at the time when the portion where the areas overlap each other forms the recording column. Thus, it is possible to delete the data of a predetermined area on the recording medium in a short time as compared with the case when completely deleting the data by writing data in the shingle recording method.

Further features of the present invention will become apparent from the following description of exemplary embodiments with reference to the attached drawings.

BRIEF DESCRIPTION OF DRAWINGS

FIGS. 12A, 12B and 12C are diagrams for describing an operation of deleting data recorded by the shingle recording method.

DESCRIPTION OF EMBODIMENTS

Hereinafter, the embodiments of the present invention will be described with reference to the attached drawings.

(First Embodiment)

The first embodiment of the present invention will be described with reference to magnetic recording by, for example, a Shingle Write/TDMR (Two-Dimensional Magnetic Recording) method. In the Shingle Write/TDMR method, when information is magnetically recorded and held on a magnetic recording medium, data of a certain length (i.e., a data recording column) is recorded in a relative movement direction of the magnetic recording medium and a magnetic recording element. After that, at a position which is slightly offset from the previously recorded data recording column in the perpendicular direction, data of the same length is recorded in the relative movement direction of the magnetic recording medium and the magnetic recording element from the start position same as that of the previously recorded data recording column such that an overlap exists between the data and the previously recorded data recording column.

The above operation is repeated multiple times to complete the recording for each unit of recording data such that the mutually adjacent recording columns partially overlap each other.

Further, when the data of each unit of recording data recorded on the magnetic recording medium as described above is read, the whole area for each unit of recording data is read using a high-resolution reading element. Then, the read data is decompressed on a two-dimensional plane, the decompressed data is subjected to a signal process (two-dimensional signal process), and the processed data is demodulated.

Figure 1:
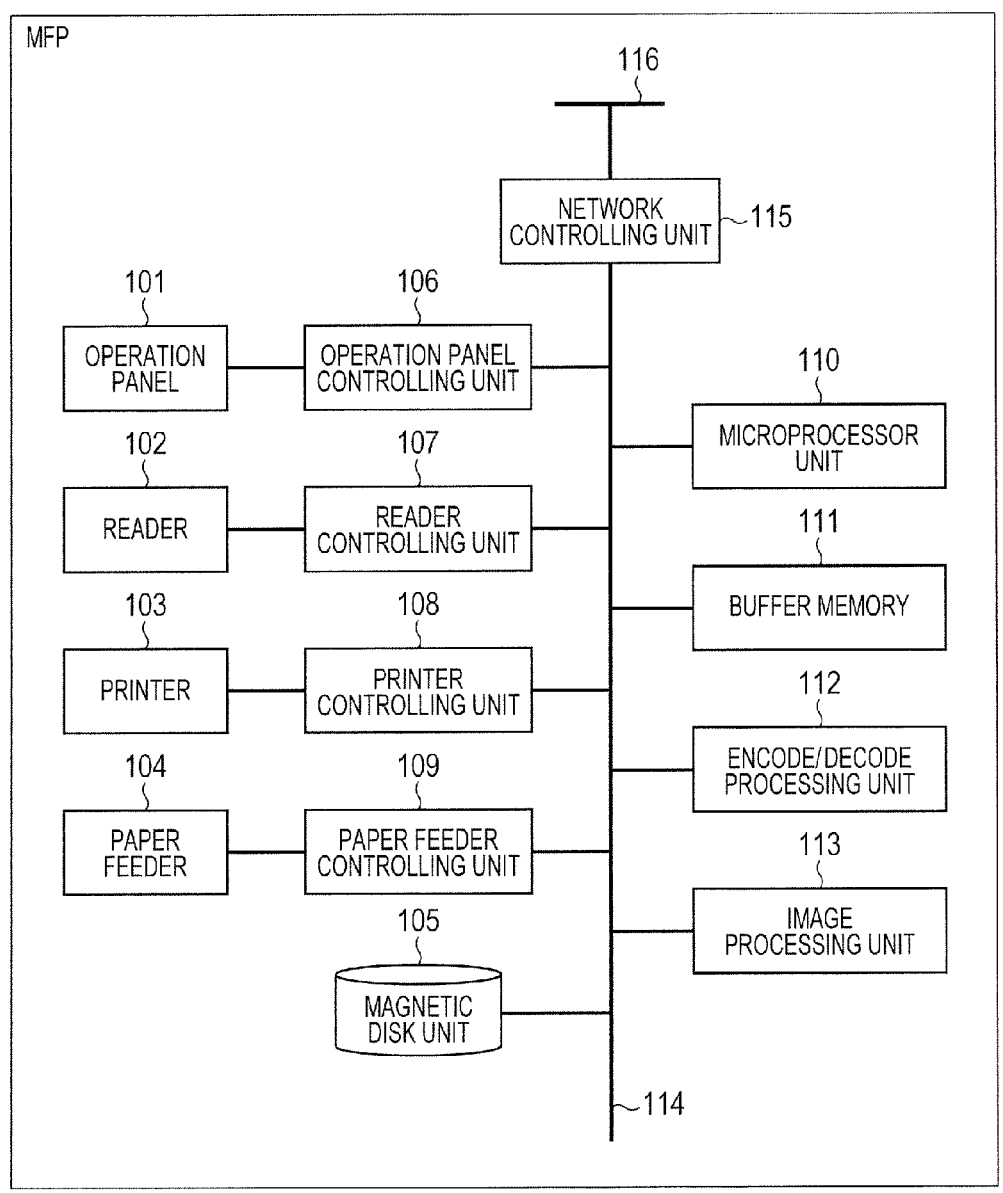
FIG. 1 is a block diagram illustrating the internal constitution of an MFP (multifunction peripheral) according to a first embodiment of the present invention.

FIG. 1 is a block diagram illustrating the internal constitution of an MFP for which a magnetic recording apparatus by the Shingle Write/TDMR method is used, in the present embodiment.

In FIG. 1, an operation panel 101 is equipped with dials, switches and the like to be used by an operator. More specifically, instructions for copying, facsimile transmission and the like, settings of enlargement and reduction, inputting of a transmission destination's telephone number, and the like are performed using the operation panel 101.

A reader (reading unit) 102 photoelectrically scans an original document to be transferred and forms an image signal from the scanned original document. More specifically, the original document is placed on the platen of the reader 102, the set original document is read by moving the photoelectric conversion elements such as CCDs aligned in the main operation direction to the direction (sub-scanning direction) perpendicular to the element-aligned direction, and electrical image data is generated from the read original document. Then, the image data read by the reader 102 is stored in a buffer memory 111 via a reader controlling unit 107.

A printer 103 visually forms, on a recording paper, the image data read by the reader 102 or the image data transmitted via a LAN (local area network) 116. In the present embodiment, an electrophotographic printer is connected to the MFP. Incidentally, the image data stored in the buffer memory 111 is transferred to the printer 103 via a printer controlling unit 108.

A paper feeder 104 feeds the recording paper for printing the image data by the printer 103. More specifically, the paper feeder 104 feeds, from among the recording papers stored and held therein, the recording paper designated by an instruction from a microprocessor unit 110 or a user's instruction from the operation panel 101, to the printer 103.

A magnetic disk unit 105, for which the magnetic recording method by the Shingle Write/TDMR method is used, stores therein the image data read by the reader 102 and the image data transmitted via the LAN 116.

An operation panel controlling unit 106, which controls the operation panel 101, analyzes the user's instruction input via the operation panel 101, and transfers the analyzed instruction content to the microprocessor unit 110.

A reader controlling unit 107, which controls the reader 102, reads the original document placed on the platen by driving the reader 102, and stores the read image data in the buffer memory 111, in response to the instruction from the microprocessor unit 110.

A printer controlling unit 108, which controls the printer 103, obtains the image data from the buffer memory 111, and outputs the obtained image data to the printer 103, in response to the instruction from the microprocessor unit 110. Moreover, the printer controlling unit 108 prints and outputs an image on the recording paper by driving the printer 103 in accordance with the output image data.

A paper feeder controlling unit 109 obtains information concerning recording paper sizes, presence/absence of recording paper, remaining numbers of recording papers and the like from the paper feeder 104, and transfers the obtained information to the microprocessor unit 110. When the printer 103 performs a printing operation, the paper feeder controlling unit 109 controls the paper feeder 104 to feed the recording paper instructed by the microprocessor unit 110 or the operation panel 101 to the printer 103.

The microprocessor unit 110, which controls the operations of the MFP, outputs instructions to the respective blocks to perform scanning, printing, data storing operations. Incidentally, the microprocessor unit 110 includes a ROM (read only memory) of storing programs and the like for the operations of the MFP, a RAM (random-access memory) of temporarily storing the data necessary for the controlling, and the like.

The buffer memory 111 temporarily stores therein the image data. More specifically, when the original document is read by the reader 102, when the image data is read from the magnetic disk unit 105, and when the image data is obtained via the LAN 116, the read and obtained image data are temporarily stored in the buffer memory 111.

Moreover, when the image data is printed by the printer 103, when the image data is stored in the magnetic disk unit 105, and when the image data is output via the LAN 116, the respective image data are output from the buffer memory 111.

An encode/decode processing unit 112 performs encoding (compressing process) to the image data stored in the buffer memory 111, and performs decoding (decompressing process) to the compressed image data.

An image processing unit 113 performs an image process and image quality improving process, in response to the user's instruction from the operation panel 101.

An internal bus 114 is used to mutually connect the above respective blocks. Namely, the image data, and commands and setting values for the operations of the respective blocks are transferred via the internal bus 114.

A network controlling unit 115 is provided between the external LAN 116 and the internal bus 114. Namely, the internal bus 114 is connected to the external LAN 116 via the network controlling unit 115.

Besides, the network controlling unit 115 performs protocol conversion between the external LAN 116 and the internal bus 114. Therefore, the image data input via the external LAN 116 can be stored in the buffer memory 111 and then printed and output from the printer 103, as well as the image data read from the reader 102. Moreover, the relevant image data can be stored in the magnetic disk unit 105.

Figure 2:
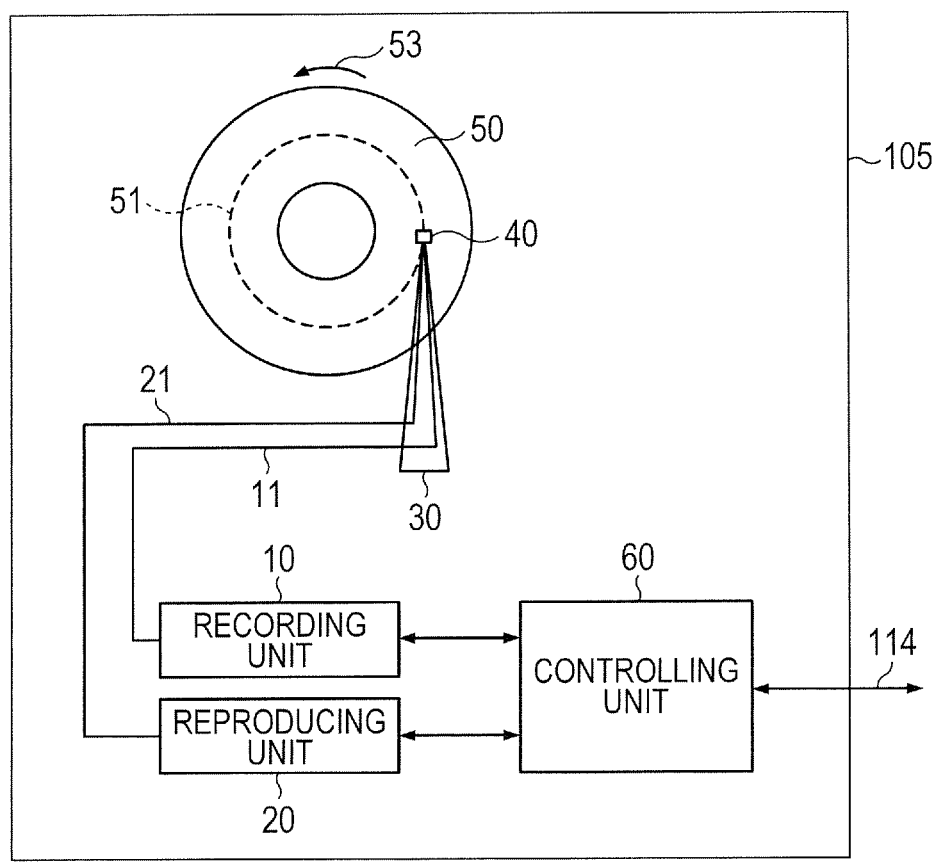
FIG. 2 is a diagram illustrating the internal constitution of a magnetic disk.

FIG. 2 is a diagram illustrating an example of the constitution of the magnetic disk unit 105 illustrated in FIG. 1. The magnetic disk unit 105 includes a recording unit 10, a reproducing unit 20, a controlling unit 60, a head supporting and positioning mechanism (moving mechanism) 30, a slider 40 and a magnetic recording medium 50.

The recording unit 10 records data on the magnetic recording medium 50 in response to an instruction from the controlling unit 60. The recording unit 10 outputs a writing signal and data to the head supporting and positioning mechanism 30 and the slider 40 via a recording signal line 11, thereby recording the data on the magnetic recording medium 50.

A recording element 41 (FIG. 3), which is controlled by the recording unit 10, writes, on the magnetic recording medium 50, the data (i.e., a data column) of a certain length in a relative movement direction of the magnetic recording medium and the recording element 41, and, then, at the position which is offset from the written data column in the perpendicular direction, writes data of the length same as the certain length from the start position same as that of the recording (writing) of the data column in the relative movement direction of the magnetic recording medium 50 and the recording element 41. After then, the above operation is repeated multiple times to complete the data recording for an information recording area.

When reproducing information, the reproducing unit 20 reads the data of the information recording area recorded on the magnetic recording medium, by controlling the head supporting and positioning mechanism 30 and a reading element 42 (FIG. 3) of the slider 40. The reproducing unit 20 decompresses, on the two-dimensional plane, the data of the information recording area recorded on the magnetic recording medium 50, performs the signal process (two-dimensional signal process) to the decompressed data, and thus demodulates the recorded data.

The controlling unit 60 controls the recording unit 10 and the reproducing unit 20. In response to instructions of the recording unit 10 and the reproducing unit 20, the head supporting and positioning mechanism 30 moves the slider 40 to the position determined by the recording unit 10 and the reproducing unit 20 on the magnetic recording medium 50.

The slider 40, which includes the recording element 41 and the reading element 42, performs information writing onto the magnetic recording medium by the recording element 41 and information reading by the reading element 42. The reading element 42, which has high resolution power, reads all the data in the information recording area, and outputs the read data to the reproducing unit 20 via a reproduction signal line 21.

The magnetic recording medium 50 has tracks 51 in which information is recorded and read. An arrow 53 indicates the rotation direction of the magnetic recording medium 50.

Figure 3:
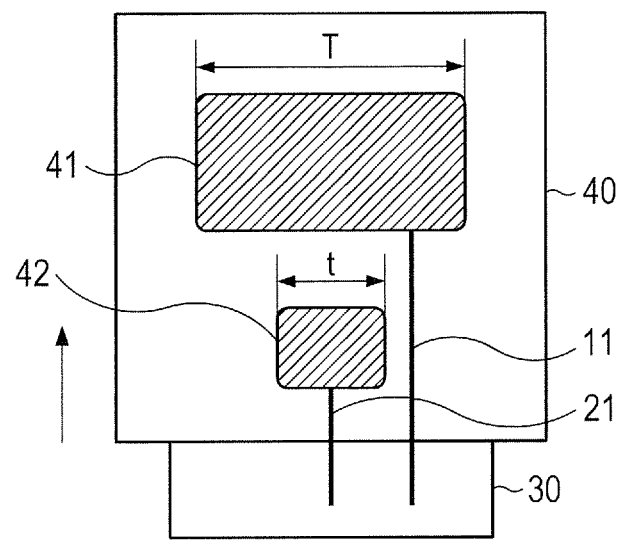
FIG. 3 is a diagram illustrating the internal constitution of a slider.

FIG. 3 is the diagram illustrating an example of the constitution of the slider 40 illustrated in FIG. 2. The slider includes the recording element 41 and the reading element 42.

The recording element 41, which is connected to the recording unit 10, writes the data on the magnetic recording medium in response to a recording signal transferred from the recording unit 10 via the recording signal line 11. Also, the data to be written on the magnetic recording medium is transferred from the recording unit 10 via the recording signal line 11.

The reading element 42, which is connected to the reproducing unit 20, reads the data from the magnetic recording medium and outputs the read data to the reproducing unit 20, in response to a reproduction signal transferred via the reproduction signal line 21.

Since the mechanism and constitution of the recording element 41 are more complicated than those of the reading element 42, the size of the recording element 41 is generally larger than that of the reading element 42. Therefore, as illustrated in FIG. 3, the width T of the recording element 41 is larger than the width t of the reading element 42. Thus, the width of the data column written or recorded on the magnetic recording medium by the recording element 41 is T. On another front, if the data column having the width t exists on the magnetic recording medium, the data can be read by the reading element 42, so that the shingle recording method can be adopted.

Figure 4:
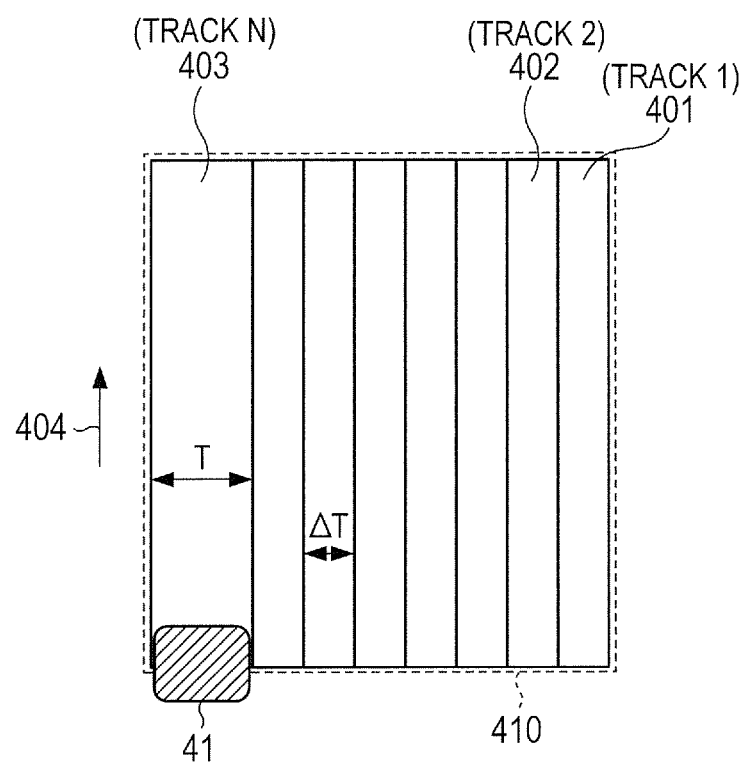
FIG. 4 is a diagram for describing an operation of writing data in an information recording area.

FIG. 4 is a diagram for describing the information recording area on the magnetic recording medium 50 and an operation of writing the data in the information recording area.

First, in the track 1 (401), the recording element 41 records the data of M-bit length on the magnetic recording medium by applying a recording magnetic field.

Next, the position of the recording element 41 is set to be offset by $\Delta T$ in the direction perpendicular to the movement direction of the magnetic recording medium 50. Then, at the relative position of the magnetic recording medium 50 and the recording element 41, the recording operation is performed with the head of the data area same as that of the previous recording, thereby recording the next data of M-bit length in the track 2 (402).

Subsequently, the data recording is sequentially performed in the same way for the track 3, the track 4, ..., the data recording is performed for the track N (N≥2) (403), and the recording for a recording/reproducing unit area is ended. In FIG. 4, a recording/reproducing unit area 410 is shown. Here, the recording/reproducing unit area will be called the zone in the present embodiment.

In the zone, the N tracks each having the M-bit length are arranged on the magnetic recording medium 50 in the offset direction of the recording element 41, and the recording capacity thereof is M×N bits.

Incidentally, an arrow 404 in FIG. 4 indicates the movement direction of the magnetic recording medium 50. Since the magnetic recording medium 50 is moved in the direction of the arrow 404 in regard to the recording element 41, the data is written and recorded in the direction opposite to the arrow 404 (i.e., the downward direction in FIG. 4) in the zone 410.

The width T corresponds to the width in which the data is written by the recording element 41 on the magnetic recording medium 50. In the present embodiment, it is assumed that the data is written with the width of the recording element 41.

By the above operation, the track of the width ΔT is formed in the zone 410. Incidentally, since the shingle recording is not performed to the final track N, the width of this track is T which is the same as the width of the data writing by the recording element 41 on the magnetic recording medium 50, and the width of the final track is whereby larger than those of other tracks.

Here, the number N of the tracks recorded in the zone 410 depends on the width L of the zone, the width T of the recording element 41, and the offset quantity ΔT by which the recording element 41 is moved in the direction perpendicular to the movement direction of the magnetic recording medium 50 for the recording of the next track. More specifically, the number N is obtained by the expression N=(L−T)/ΔT+1.

Figure 5:
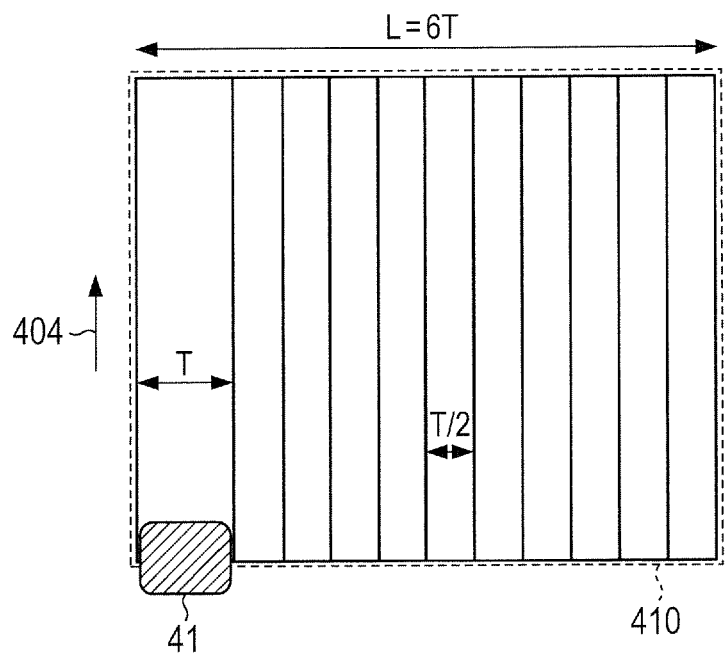
FIG. 5 is a diagram for describing an example of a state that data is recorded by a shingle writing (recording) method.

FIG. 5 is a diagram for describing an example of the state that the data is recorded in the zone by the shingle writing (recording) method. In FIG. 5, the width T of the recording element 41 is set as it is, the width L of the zone 410 is set to 6T (six times the width of the recording element 41), and the offset quantity ΔT of the recording element 41 is set to T/2. In this case, the number N of the tracks recordable in the zone 410 is N=(6T−T)/(T/2) 1=11. Namely, the 11 tracks exist in the zone.

Figure 6:
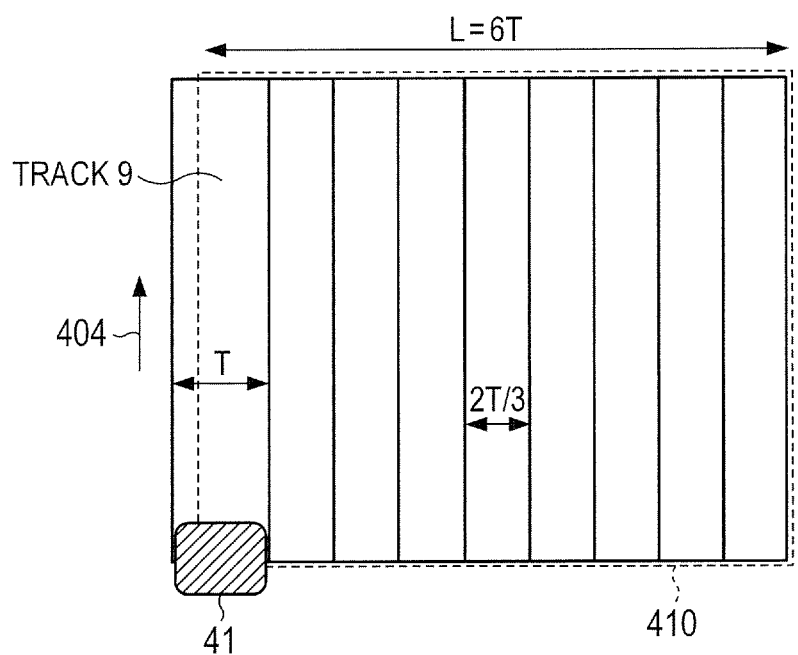
FIG. 6 is a diagram for describing another example of the state that the data is recorded by the shingle recording method.

FIG. 6 is a diagram for describing another example of the state that the data is recorded in the zone by the shingle writing method. In FIG. 6, the width T of the recording element 41 is set as it is, the width L of the zone 410 is set to 6T (six times the width of the recording element 41), and the offset quantity ΔT of the recording element 41 is set to 2T/3. In this case, the number N of the tracks recordable in the zone 410 is N=(6T−T)/(2T/3) 1=8.5. Incidentally, if a decimal fraction is included in the result obtained by the expression, the track is recorded outside the zone. In FIG. 6, the data of the track 9 is recorded not only within the zone 410 but also outside the zone.

However, since the adjacent zones are arranged with a predetermined interval on the magnetic recording medium 50, the data recorded outside the zone as shown in FIG. 6 does not affect the data stored in the adjacent zone.

Further, since the data of the track 9 is recorded also in the zone, the nine tracks resultingly exist within the zone in FIG. 6. As just described, if the number m of the tracks has a value after the decimal point, the number N of the tracks in which the data have been written and recorded is given as the value (m+1) obtained by rounding up the value after the decimal point.

Figure 7:
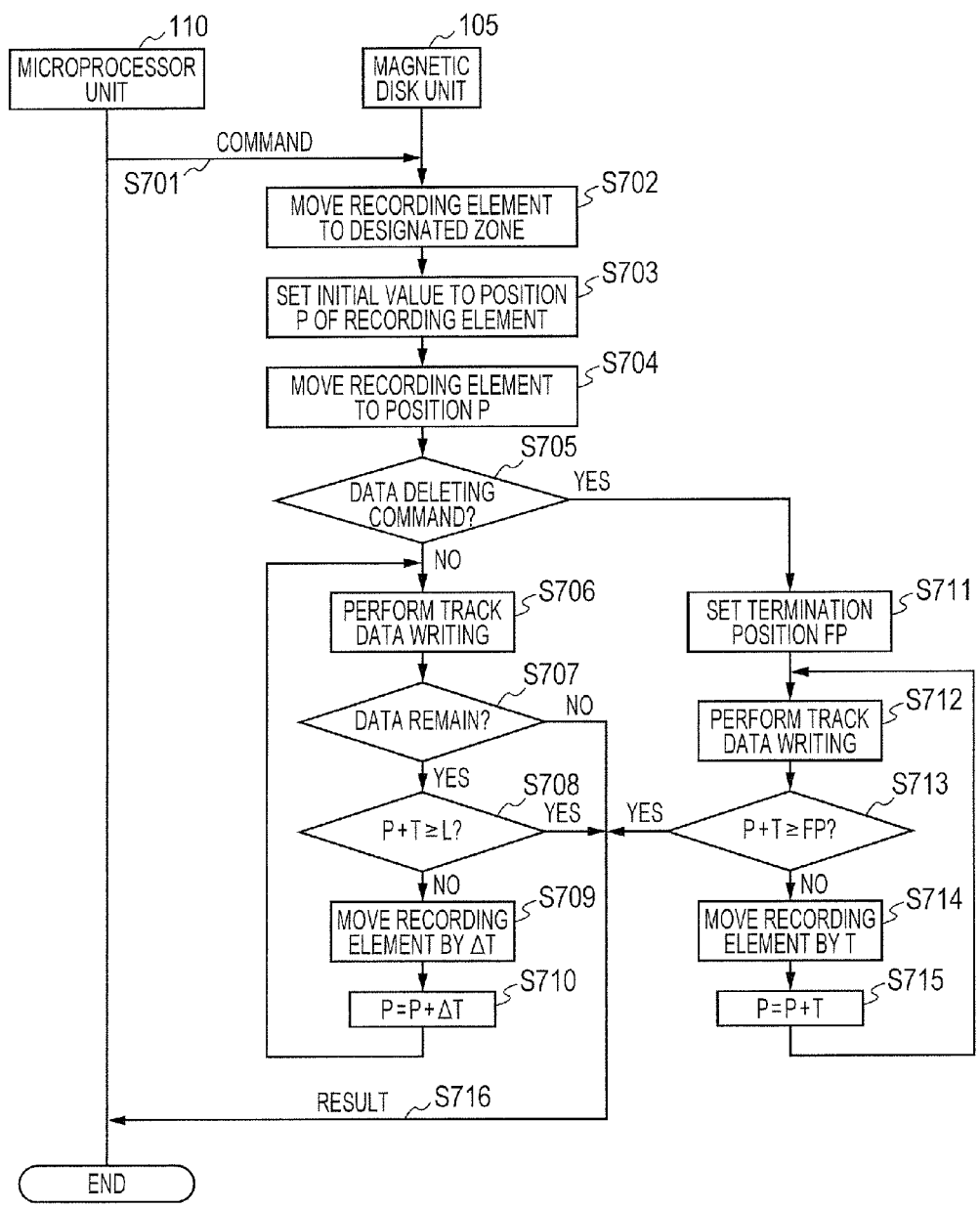
FIG. 7 is a flow chart for describing an operation of the magnetic disk in the first embodiment.

FIG. 7 is a flow chart for describing an operation procedure for performing data writing or data deleting in regard to a zone, according to the present embodiment. Incidentally, in the description of the flow chart in FIG. 7, the width L of the zone area, the width T of the recording element 41 and the offset quantity ΔT of the recording element 41 defined in FIGS. 4 to 6 are used. In the present embodiment, it is assumed that such values have been stored in the recording unit 10 or the controlling unit 60, and can be referred by the controlling unit 60.

Hereinafter, the operation of the present embodiment will be described with reference to FIG. 7. In the flow chart of FIG. 7, the process to be performed by the magnetic disk unit 105 is achieved on the condition that a CPU (central processing unit) of the controlling unit 60 decompresses the program recorded in a non-volatile memory to the working memory area of a memory and then executes the decompressed program.

First, the microprocessor unit 110 outputs a data writing command, a data deleting command or the like to the magnetic disk unit 105 (S701).

Figure 8A:
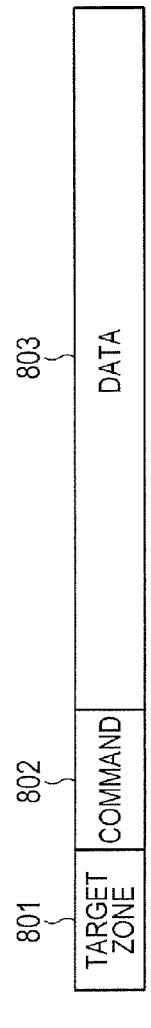
FIGS. 8A, 8B, 8C, 8D and 8E are diagrams illustrating examples of commands to be transferred and received between a microprocessor unit and a magnetic disk unit.

FIGS. 8A to 8E are diagrams illustrating examples of the commands to be transferred and received between the microprocessor unit 110 and the magnetic disk unit 105 in S701. More specifically, FIG. 8A shows the format of the command.

As shown in FIG. 8A, the command is composed of a target zone area 801 to which the target zone of an operation is stored, a command area 802 to which the command to be executed is stored, and a data area 803 to which the data to be transferred and received is stored.

FIGS. 8B to 8E respectively show the concrete examples of the commands to be transferred and received between the microprocessor unit 110 and the magnetic disk unit 105.

Figure 8B:
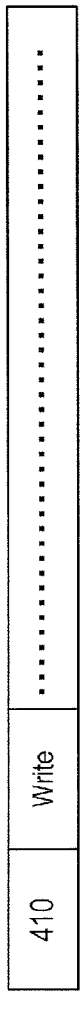

More specifically, FIG. 8B shows the example of the command for requesting data writing from the microprocessor unit 110 to the magnetic disk unit 105.

In FIG. 8B, the zone (e.g., 410) to which the data is to be written is stored in the target zone area, "Write" which indicates the data writing request is stored in the command area, and the data to be written is stored in the data area.

Figure 8C:
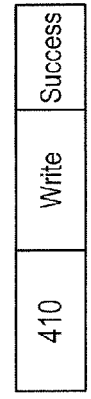

FIG. 8C shows the operation end command to be transferred from the magnetic disk unit 105 to the microprocessor unit 110 when the operation based on the command of the data writing request shown in FIG. 8B is ended. In FIG. 8C, the zone in which the operation was performed is stored in the target zone area, the content of the performed operation is stored in the command area, and the value indicating whether the operation succeeded or failed is stored in the data area.

Here, since the command of FIG. 8C is the end command to the command of FIG. 8B, the values stored in the respective target zone areas of FIGS. 8B and 8C are the same, and also the operation contents stored in the respective command areas of FIGS. 8B and 8C are the same. Further, the value such as "Success" (e.g., 0) indicating success of the operation or "Fault" (e.g., −1) indicating fault or failure of the operation is stored in the data area of FIG. 8C.

Figure 8D:
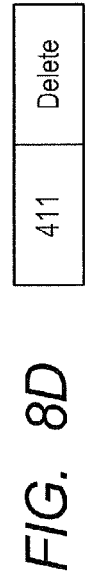

FIG. 8D shows the example of the command of requesting data deletion from the microprocessor unit 110 to the magnetic disk unit 105. In FIG. 8D, the zone (e.g., 411) for the data deletion is stored in the target zone area, and "Delete" requesting the data deletion is stored in the command area. In the present embodiment, when deleting the data, meaningless data to be used for overwriting already written (recorded) data is generated by the magnetic disk unit 105. For this reason, since there is no data to be transferred from the microprocessor unit 110 to the magnetic disk unit 105, a data area does not exist.

Figure 8E:
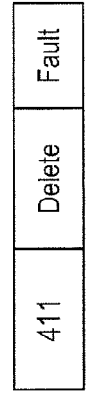

FIG. 8E shows the operation end command to be transferred from the magnetic disk unit 105 to the microprocessor unit 110 when the operation based on the command of FIG. 8D requesting the data deletion was ended. In FIG. 8E, the zone for which the operation was performed is stored in the target zone area, the content of the performed operation is stored in the command area, and the value indicating whether the operation succeeded or failed is stored in the data area.

Here, since the command of FIG. 8E is the end command to the command of FIG. 8D, the values stored in the respective target zone areas of FIGS. 8D and 8E are the same, and also the operation contents stored in the respective command areas of FIGS. 8D and 8E are the same. Further, the values such as "Success" (e.g., 0) indicating success of the operation or "Fault" (e.g., −1) indicating fault or failure of the operation is stored in the data area of FIG. 8E.

If the command is output from the microprocessor unit 110 to the magnetic disk unit 105 in S701, then the magnetic disk unit 105 moves in S702 the recording element 41 to the designated target zone area by referring to the value of the target zone area 801, and sets in S703 an initial value to the designated target zone as P indicating the position to which the data is written.

The initial value to be set in S703 indicates the position from which the recording element 41 starts the data writing. For example, 0 is set if the data writing is started from the track 1 in the zone, ΔT is set if the data writing is stated from the track 2, and (n−1)×ΔT is set if the data writing is started from the track n.

In S704, the magnetic disk unit 105 moves the recording element 41 to the position P in the zone to which the data is written.

In S705, it is decided whether the input command is the data deleting command or the data writing command, by referring to the operation stored in the command area 802. If it is decided that the input command is the data writing command, the magnetic disk unit 105 performs in S706 a data writing operation (i.e., a recording process in a recording mode) to a track by outputting the recording signal to the recording element 41 via the recording signal line 11. Here, the data writing operation to be performed to the track is not limited to the operation of completely writing the data of one track at all times. For example, if the data had already been written in the track partway before the data writing operation is performed, the data writing is performed so as to add the newly written data to the already written data. Besides, if the quantity of the data to be written is smaller than the capacity of the track, the writing operation to the magnetic recording medium is ended at a point of time when the data to be written becomes zero even if further data can be written in this track.

If the data writing operation to the track is ended in S706, the magnetic disk unit 105 decides in S707 whether or not the data to be written still remains. If the data stored in the data area 803 were all written, the magnetic disk unit 105 ends in S716 the data writing based on the writing command, and then outputs the writing operation end command shown in FIG. 8C to the microprocessor unit 110.

On the other hand, if the data to be written still remains, the magnetic disk unit 105 decides in S708 whether or not the data can be written in the zone. In S708, the decision is performed based on whether or not the track data written in S706 is within the zone.

In FIG. 7, the decision is performed by comparing the value obtained by adding the width T of the recording element to the position P of the recording element 41 with the width L of the zone. That is, if the value of P+T (i.e., in a certain zone, the width of the portion to which the data are written by one or more tracks) is equal to or larger than the width L of the zone, it is decided that data cannot be written anymore in the relevant zone, and the data writing to the relevant zone is ended.

Next, in S716, the writing operation end command shown in FIG. 80 is transferred to the microprocessor unit 110.

If the value of P+T is smaller than the width L, the magnetic disk unit 105 offsets (moves) in S709 the recording element 41 by ΔT in the direction perpendicular to the movement direction of the magnetic recording medium 50 to write the data to the next track. Then, the magnetic disk unit 105 sets in S710 the value obtained by adding the offset value ΔT to the value of the position P of the recording element, and again performs in S706 the data writing.

If it is decided in S705 that the input command is the data deleting command, the magnetic disk unit 105 calculates in S711 the termination position of the data to be deleted and sets the calculated position to a variable FP, as preparation for data deletion. Here, the termination position set in S711 indicates the edge position to which the data to be deleted has been written, in the zone of the magnetic recording medium.

For example, in the case where the data have been written up to the track n in the zone, since the data have been written with the width ΔT up to the track (n−1) and the data has been written with the width T in the track n, the variable FP is given as (n−1)×ΔT+T.

After the data termination position was set to the variable FP in S711, the magnetic disk unit 105 outputs in S712 the recording signal to the recording element 41 via the recording signal line 11 to perform the data writing operation (i.e., a recording process in a deleting mode) to the track. Incidentally, the data to be written in S712 is data which has a meaningless value because it aims to merely delete the previously recorded data, and is generated by the magnetic disk unit 105. As well as the data writing operation in S706, the data writing operation in S712 is not limited to the operation of completely writing the data of one track. That is, the writing of the meaningless data is performed only to the data to be subjected to the data deleting operation.

If the data writing in S712 is ended, it is decided in S713 whether or not the data to be deleted still remains in the zone. More specifically, it is decided in S713 whether or not the area to which the data was written as the result of the data writing in S712 has a value equal to or larger than the variable FP set in S711.

In FIG. 7, the decision is performed by comparing the value obtained by adding the width T of the recording element to the position P of the recording element 41 with the deletion data termination position FP. That is, if the value of P+T (i.e., in a certain zone, the value indicating the edge position of the area for which the data deletion was performed) is equal to or larger than the value of the position FP, it is decided that the data deletion to the relevant zone is ended, so that the data writing to the relevant zone is ended.

Next, in S716, the data deleting operation end command shown in FIG. 8E is transferred to the microprocessor unit 110.

If it is decided in S713 that the value of P+T is smaller than the value of the position FP, the magnetic disk unit 105 continues to write the meaningless data for the data deletion. Consequently, in S714, the magnetic disk unit 105 offsets (moves) the recording element 41 by T. In S715, the value obtained by adding the offset value T to the value of the position P of the recording element is set, and the process is returned to S712 to again perform the data writing to the track.

FIGS. 9A to 9D are diagrams for describing the operation of the magnetic disk unit 105 of writing the data by the shingle writing (recording) method described in FIG. 5 to the zone (410) designated in response to the received data writing command. Hereinafter, the data writing operation by the magnetic disk unit 105 in FIG. 7 will be described with reference to FIGS. 9A to 9D.

If the magnetic disk unit 105 obtains the command in S701 of FIG. 7, the magnetic disk unit 105 moves the recording element 41 to the zone (410) designated in S702 by referring to the target zone area 801 of the obtained command.

In S703, the initial value is set to the position P of the recording element 41. Since data is not written in the zone 410 in FIG. 9A, 0 (i.e., the right edge of the zone in FIGS. 9A to 9D) which is the first position for the data writing to the zone is set to the position P.

In S704, the magnetic disk unit 105 moves the recording element 41 of the slider 40 to the position P (i.e., 0 set in S703) in the zone 410, by outputting the recording signal to the head supporting and positioning mechanism 30 via the recording signal line 11.

Figure 9A:
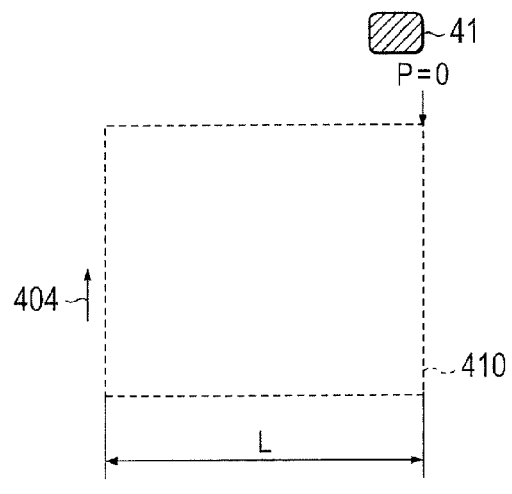
FIGS. 9A, 9B, 9C and 9D are diagrams for describing an operation of writing data by the shingle recording method.

FIG. 9A shows the state that the recording element 41 was moved to the position P by the process in S704. In this state, the recording element 41 is positioned at the right edge (i.e., P=0) of the zone 410. Since the data writing command is received in S705 by referring to the command area of the command received in S701, the process is advanced to S706 to perform the data writing.

Figure 9B:
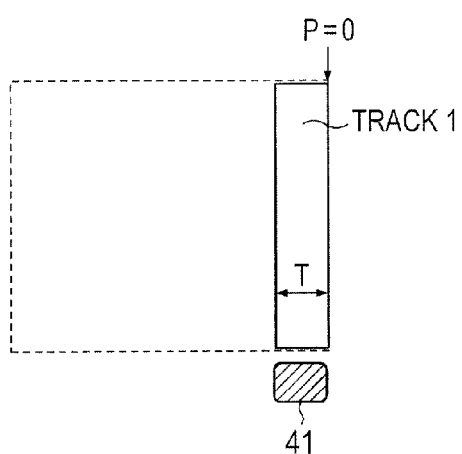

FIG. 9B shows the state that the data writing is performed to the zone 410 in S706. That is, the data has been written in the portion of the track 1 in FIG. 9B. Incidentally, since the data writing is performed with the width of the recording element 41, the width of the track 1 is equal to the width T of the recording element.

If the data is written in S706, then the magnetic disk unit 105 decides in S707 whether or not the data to be written still remains. If the data still remains, the magnetic disk unit 105 decides in S708 whether or not the area to which the data can be written exists in the zone 410.

If it is decided in S708 that the area to which the data can be written exists in the zone 410, in S709, the recording element 41 is offset by ΔT (T/2 here) which is the track width of leaving the data on the magnetic recording area by the shingle writing method.

Next, in S710, ΔT is added to the value of the position P to which the data is written (P=T/2 is obtained by the addition), and the process is returned to S706 to again perform the data writing to the track.

Figure 9C:
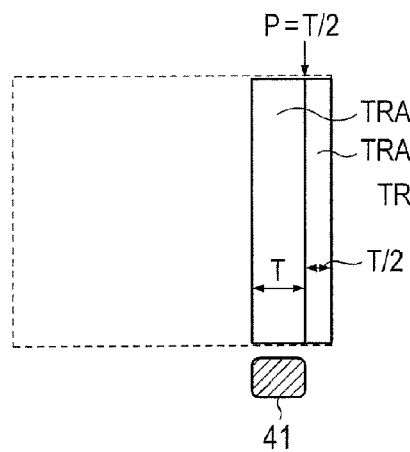

FIG. 9C shows the state that the second data writing is performed in S706. That is, by the second data writing, the data has been written in the portion of the track 2 in FIG. 9C. Thus, the data written in the track 1 has been recorded in the zone 410 with the width ΔT (=T/2) obtained by offsetting the recording element in S709. The value of the position P of the recording element 41 is equal to T/2 set in S710.

After the second data writing in S706, the magnetic disk unit 105 again decides in S707 whether or not the data to be written still remains. If the data still remains, the magnetic disk unit 105 decides in S708 whether or not the area to which the data can be written exists in the zone 410.

If the area to which the data can be written exists in the zone 410, in S709, the recording element 41 is offset by ΔT (=T/2) which is the track width of leaving the data on the magnetic recording area in the shingle writing method.

Next, in S710, ΔT is added to the value of the position P to which the data is written (P=T is obtained by the addition), and the process is returned to S706 to again perform the data writing to the track.

After then, the operations in S706 to S710 are repeated until the area to which the data can be written becomes zero in the zone 410.

Figure 9D:
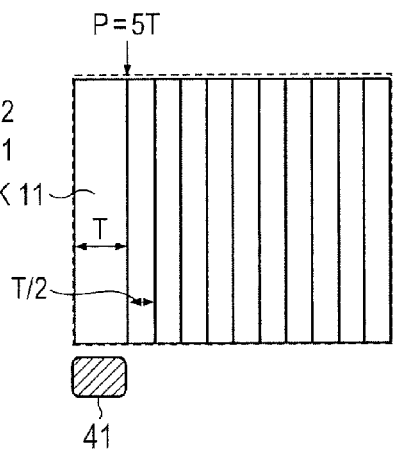

FIG. 9D shows the state that the 11 data writings are performed to the zone 410. After the eleventh data writing was performed in S706, it is decided in S707 whether or not the data to be written still remains. If the data still remains, then it is decided in S708 whether or not the area to which the data can be written exists in the zone 410.

In S708, the magnetic disk unit 105 compares the position of the edge to which the data was recorded by the data writing to the track 11 with the width of the zone 410. When the data writing is performed to the track 11, the value of the position P of the recording element 41 is equal to 5T which is obtained by multiplying the number of the tracks (10 here) to which the data were written before the data writing is performed to the track 11 and the width (T/2) of the track together. Then, the value of P+T obtained by adding the value P and the width T of the track 11 together is compared with the width L of the zone.

Here, since the width L of the zone is 6T in FIG. 5, the value of P (=5T)+T is equal to the width L of the zone. Therefore, the magnetic disk unit 105 decides in S708 that the area to which the data can be written does not exist anymore in the zone, ends the data writing, outputs in S716 the result of the command to the microprocessor unit 110, and ends the operation entirely.

Figure 10A:
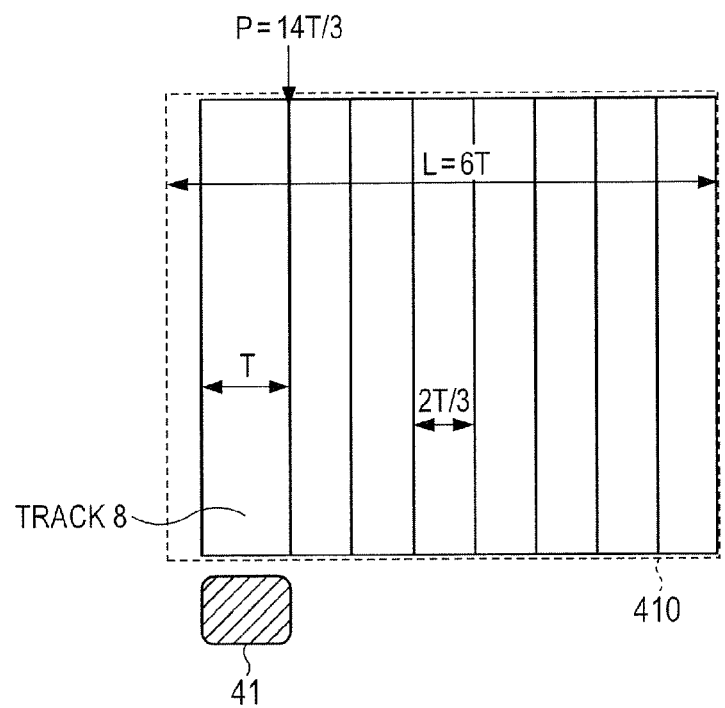
FIGS. 10A and 10B are diagrams for describing an operation of writing data by the shingle recording method.
Figure 10B:
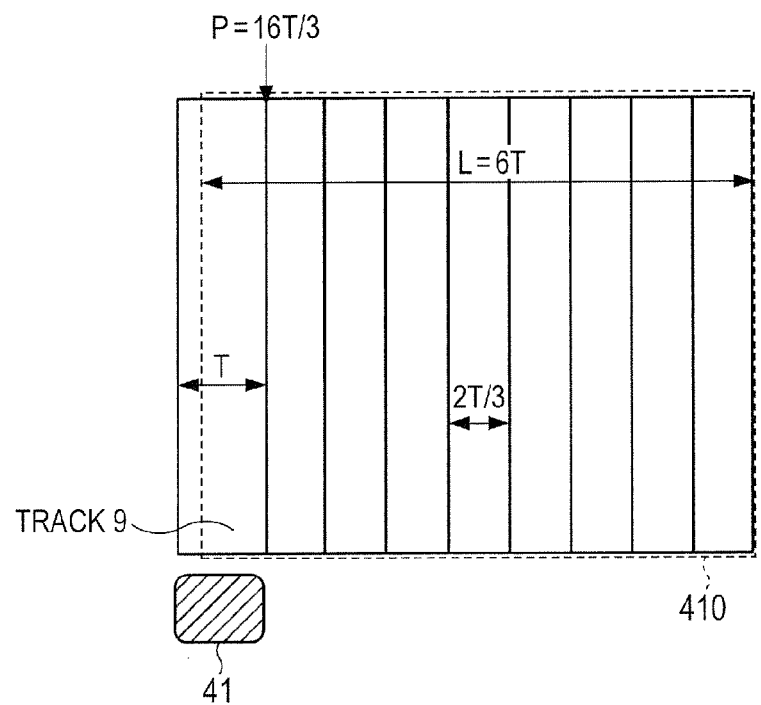

FIGS. 10A and 10B are diagrams for describing the operation of the magnetic disk unit 105 of writing the data by the shingle writing (recording) method described in FIG. 6 to the zone 410 in response to the received data writing command.

Hereinafter, the data writing operation by the magnetic disk unit 105 in FIG. 7 will be described with reference to FIGS. 10A and 10B.

FIG. 10A shows the state that the data writing to the track 8 was ended in S706. At this time, the value of the position P of the recording element 41 is equal to 14T/3 which is obtained by multiplying the number of the tracks (7 here) to which the data were written before the data writing is performed to the track 8 and the width (2T/3) of the track together.

After the data writing was performed in S706, it is decided in S707 whether or not the data to be written still remains. If the data to be written remains, then it is decided in S708 whether or not the area to which the data can be written exists in the zone 410.

In S708, the value of P+T obtained by adding the value of the position P of the recording element and the width T of the track 8 together is compared with the width L of the zone. After the data writing to the track 8 was performed, the value of the position P of the recording element 41 is 14T/3.

The value of P+T obtained by adding the value of the position P and the width T of the track 8 together is compared with the width L of the zone.

Here, since the width L of the zone is 6T in FIG. 6, the value of P+T (=14T/3+T=17T/3) is smaller than the width L of the zone. Therefore, the magnetic disk unit 105 decides that the area to which the data can be written exists in the zone 410, and offsets in S709 the recording element 41 by ΔT (=2T/3) which is the track width of leaving the data on the magnetic recording area in the shingle writing method.

Next, in S710, ΔT is added to the value of the position P to which the data is written (thus, P=16T/3 is obtained by the addition), and the process is returned to S706 to again perform the data writing to the track.

FIG. 10B shows the state that the data writing to the track 9 was ended in S706. At this time, the value of the position P of the recording element 41 is equal to 16T/3. After the data writing was performed in S706, it is decided in S707 whether or not the data to be written still remains. If the data to be written remains, then it is decided in S708 whether or not the area to which the data can be written exists in the zone 410.

In S708, the decision is performed by comparing 19T/3 obtained by adding the position P (=16T/3) of the recording element and the width T of the track 9 together is compared with the width L of the zone.

Since the width of the zone is 6T, the value of P+T (=19T/3) is larger than the width L of the zone. Therefore, the recording unit 10 decides in S708 that the area to which the data can be written does not exist anymore in the zone, and thus ends the data writing.

Incidentally, in the data writing operation according to the present embodiment, there is a possibility that the data of the track 9 is written exceeding the zone width as shown in FIGS. 10A and 10B, according to the relation between the data writing width T of the recording element 41 and the width L of the zone.

FIGS. 11A to 11D are diagrams for describing the operation that the magnetic disk unit 105 deletes the data recorded by the shingle writing (recording) method described in FIG. 5 for the zone 410, in response to a data deleting command. Hereinafter, the data deleting operation by the magnetic disk unit 105 in FIG. 7 will be described with reference to FIGS. 11A to 11D.

If the magnetic disk unit 105 obtains the command in S701 of FIG. 7, the magnetic disk unit 105 moves the designated recording element 41 to the designated zone 410 in S702 by referring to the target zone area 801 of the obtained command.

Next, in S703, an initial value is set to the position P of the recording element 41.

Figure 11A:
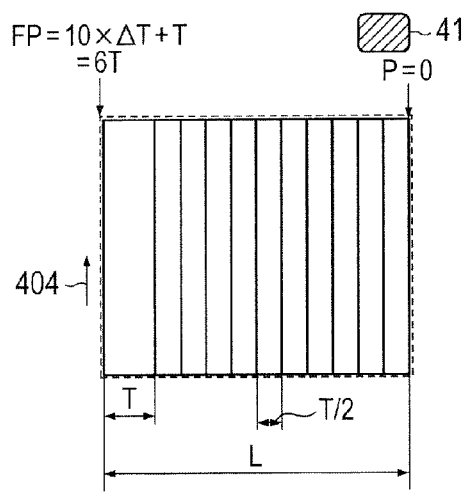
FIGS. 11A, 11B, 11C and 11D are diagrams for describing an operation of deleting data recorded by the shingle recording method.

Since all the data recorded in the zone 410 are deleted in FIG. 11A, the first position 0 (i.e., the right edge of the zone in FIG. 11A) at which the data to be deleted has been stored is set to the position P.

In S704, the magnetic disk unit 105 moves the recording element 41 of the slider 40 to the position P (i.e., 0 set in S703) in the zone 410, by outputting the recording signal to the head supporting and positioning mechanism 30 via the recording signal line 11.

FIG. 11A shows the state that the recording element 41 was moved by the process in S704. In this state, the recording element 41 is positioned at the right edge (i.e., the position of P=0) of the zone 410.

After then, if the magnetic disk unit 105 has received in S705 the data deleting command by referring to the command area 802 of the command received in S701, the process is advanced to S711 to set the termination position FP at which the data to be deleted has been written. In FIG. 11A, as described in FIG. 5, since the data has been written in the area having the width L (=6T) same as the width of the zone 410, 6T is set to the data termination position FP.

Figure 11B:
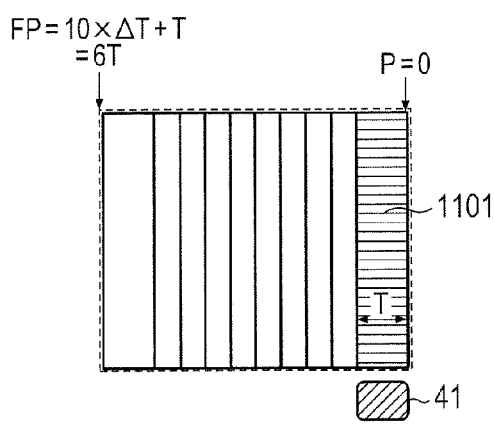

After the data termination position FP was set in S711, the process is advanced to S712 to perform the data writing to the track. FIG. 11B shows the state that the data has been written to the zone 410 in S712. Namely, the meaningless data has been written in an area 1101 indicated by the horizontal lines in FIG. 11B. Incidentally, since the data writing is performed with the width of the recording element 41, the width of the area 1101 is equal to the width T of the recording element 41.

After the data was written in S712, the magnetic disk unit 105 decides in S713 whether or not the data to be deleted still remains in the zone.

If it is decided in S713 that the data to be deleted still remains in the zone 410, the magnetic disk unit 105 offsets in S714 the recording element by the meaningless data writing width T. That is, the quantity of movement when performing the data writing for deletion after the data recording is larger than the quantity of movement when performing the data writing.

Next, in S715, the offset value T is added to the value of the position P to which the data is written (thus, P=T is obtained), and the process is returned to S712 to again perform the meaningless data writing.

Figure 11C:
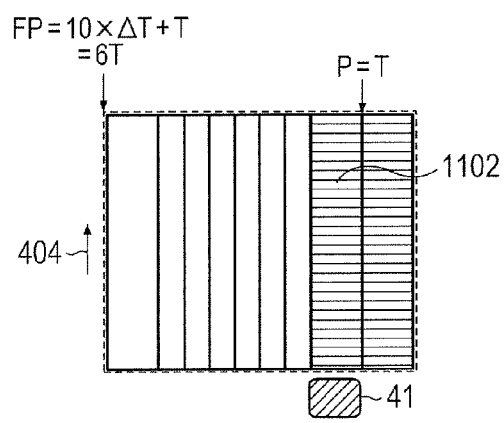

FIG. 11C shows the state that the second meaningless data writing was performed in S712. The data is written in an area 1102 by the second meaningless data writing.

After the second data writing was performed in S712, the magnetic disk unit 105 again decides in S713 whether or not the data to be deleted still remains in the zone.

If it is decided that the data to be deleted still remains in the zone 410, the magnetic disk unit 105 offsets in S714 the recording element 41 by the meaningless data writing width T.

Next, in S715, the offset value T is added to the value of the position P to which the data is written (thus, P=2T is obtained), and the process is returned to S712 to perform the meaningless data writing to the track.

Figure 11D:
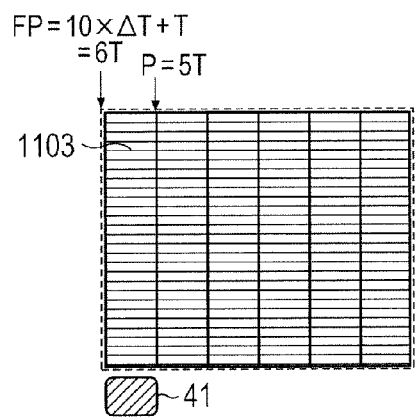

After then, the operations in S712 to S715 are repeated until the data to be deleted becomes zero in the zone 410. FIG. 11D shows the state that the six meaningless data writing operations were performed to the zone 410.

After the data writing to an area 1103 of FIG. 11D was performed in S712, the magnetic disk unit 105 compares in S713 the position of the edge from which the data was deleted by the data writing to the area 1103 with the data termination position FP.

When the data writing is performed to the area 1103, the value of the position P of the recording element 41 is equal to 5T which is obtained by multiplying the number of times of the data writing (5 here) before the meaningless data writing to the area 1103 and the data writing width T together. Then, the value of P+T (=6T) obtained by adding the value of the position P and the width T of the area 1103 together is compared with the data termination position FP.

In FIG. 11D, since the data termination position FP is 6T, the value of P+T is equal to the value of FP. Therefore, the magnetic disk unit 105 decides in S713 that the data to be deleted does not exist anymore in the zone, and thus ends the deletion of the data recorded in the zone 410.

In S716, the result of the command is output to the microprocessor unit 110, and the operation is ended.

In the present embodiment, as just described, it is possible by the six writing operations to delete the data of the 11 tracks stored by the shingle recording method illustrated in FIG. 5.

In FIGS. 11A to 11D, as illustrated in FIG. 5, the data to be deleted exists only within the area of the zone 410. However, as described in FIG. 6, the data writing might be performed outside the area of the zone 410. Hereinafter, a data deleting operation to be performed when the data to be deleted exists outside the area of the zone 410 will be described.

FIGS. 12A to 12C are diagrams for describing the operation that the magnetic disk unit 105 deletes the data stored in the zone 410 by the shingle writing (recording) method described in FIG. 6, in response to a data deleting command. Hereinafter, the data deleting operation by the magnetic disk unit 105 in FIG. 7 will be described with reference to FIGS. 12A to 12C.

If the magnetic disk unit 105 obtains the command in S701 of FIG. 7, the magnetic disk unit 105 moves in S702 the designated recording element 41 to the designated zone 410 by referring to the target zone area 801 of the obtained command.

Next, in S703, an initial value is set to the position P of the recording element 41.

To delete all the data recorded in the zone 410, 0 (i.e., the right edge of the zone in FIG. 12A) which is the first position at which the data to be deleted has been recorded is set to the position P in FIG. 12A.

In S704, the magnetic disk unit 105 moves the recording element 41 of the slider 40 to the position P (i.e., 0 set in S703) in the zone 410, by outputting the recording signal to the head supporting and positioning mechanism 30 via the recording signal line 11.

FIG. 12A shows the state that the recording element 41 was moved by the process in S704. In this state, the recording element 41 is positioned at the right edge (i.e., the position of P=0) of the zone 410.

After then, if the magnetic disk unit 105 has received in S705 the data deleting command by referring to the command area 802 of the command received in S701, the process is advanced to S711 to set the termination position FP at which the data to be deleted has been written.

In FIG. 12A, as described in FIG. 6, the data has been written in the area exceeding the width L of the zone 410, and the width of the relevant area is 8×2T/3+1=19T/3 which is obtained by adding the eight-track offset quantity 2T/3 of the recording element 41 and the data width T of the track 9 together. Thus, in S711, 19T/3 is set to the data termination position FP.

FIG. 12B shows the state that the sixth meaningless data writing was ended in S712. In this state, the meaningless data has been written in an area 1201 by the sixth data writing.

After the sixth data writing was performed in S712, the magnetic disk unit 105 decides in S713 whether or not the data to be deleted still remains in the zone.

In S713, the decision is performed using the values of the position P of the recording element 41, the data writing width T of the recording element 41 and the data termination position FP. That is, the position of the edge portion from which the data was deleted by writing the data to the area 1201 is compared with the data termination position FP set in S711.

When the data writing is performed to the area 1201, the value of the position P of the recording element 41 is equal to 5T which is obtained by multiplying the number of times of the data writing (5 here) before the meaningless data is written in the area 1201 and the data writing width T together. Then, the value of P+T (=6T) obtained by adding the value of the position P and the width T of the area 1201 together is compared with the data termination position FP.

In the state shown in FIG. 12B, all the data in the zone 410 have been deleted by overwriting the meaningless data. Here, since the value of the data termination position FP is 19T/3, this value is larger than the value of P+T (=6T). Actually, the data remains in the portion indicated by an area 1202 of FIG. 12B.

For this reason, it is decided in S713 that the data to be deleted still remains, and the recording element 41 is offset in S714 by the width T with which the meaningless data was written. Next, in S715, T is added to the value of the data writing position P (thus P=6T is obtained), and the process is returned to S712 to perform the data writing to the track.

FIG. 12C shows the state that the seventh meaningless data writing was ended in S712. In this state, the meaningless data has been written in an area 1203 by the seventh data writing.

After the seventh data writing was performed in S712, the magnetic disk unit 105 decides in S713 whether or not the data to be deleted still remains in the zone.

When the data writing is performed to the area 1203, the value of the position P of the recording element 41 is equal to the width 6T of the area, and the value of P+T (=7T) obtained by adding the value of the position P and the width T of the area 1203 together is compared with the data termination position FP (=19T/3).

In the state of FIG. 12C, the value of P+T exceeds the value of the data termination position FP. Consequently, the magnetic disk unit 105 decides that the data to be deleted does not exist in the zone 410, and ends the data deletion in the zone 410. Then, in S716, the result of the command is output to the microprocessor unit 110, and the operation is ended.

In the present embodiment, as just described, it is possible by the seven writing operations to delete the data of the nine tracks stored by the shingle recording method in FIG. 6.

As described above, in the present embodiment, the offset quantity at the time when performing the meaningless data writing to delete the data on the magnetic recording medium is made larger than the offset quantity at the time when performing the data writing by the shingle recording method to store the data on the magnetic recording medium. Thus, it is possible to reduce the number of times of the data writing for the data deletion, and it is thus possible to shorten a time necessary for the data deletion.

Incidentally, in the above description, the offset quantity of the recording element 41 in the data deleting operation is equal to the data writing width T to the recording medium. However, the offset quantity is not limited to the data writing width. Namely, if the offset quantity is larger than the offset quantity $\Delta T$ at the data writing time, it is possible to reduce the number of times of the data writing for the data deletion.

Besides, when the meaningless data is written for the data deletion in S712 of FIG. 7, it is thought to write the data with a recording magnetic field stronger than that at the data writing in S706. Thus, it is possible to delete the data recorded on the magnetic recording medium 50 more strongly.

(Second Embodiment)

In the first embodiment, the data writing operation is controlled in the magnetic disk unit 105 by transferring the data writing command or the data deleting command from the microprocessor unit 110 to the magnetic disk unit 105.

For this reason, in the first embodiment, the magnetic disk unit 105 controls the offset quantity of the recording element 41 and the data writing to the zone.

The second embodiment is directed to an example that the microprocessor unit 110 controls the offset quantity of the recording element 41 and the data to be written to or deleted from each zone.

Figure 13:
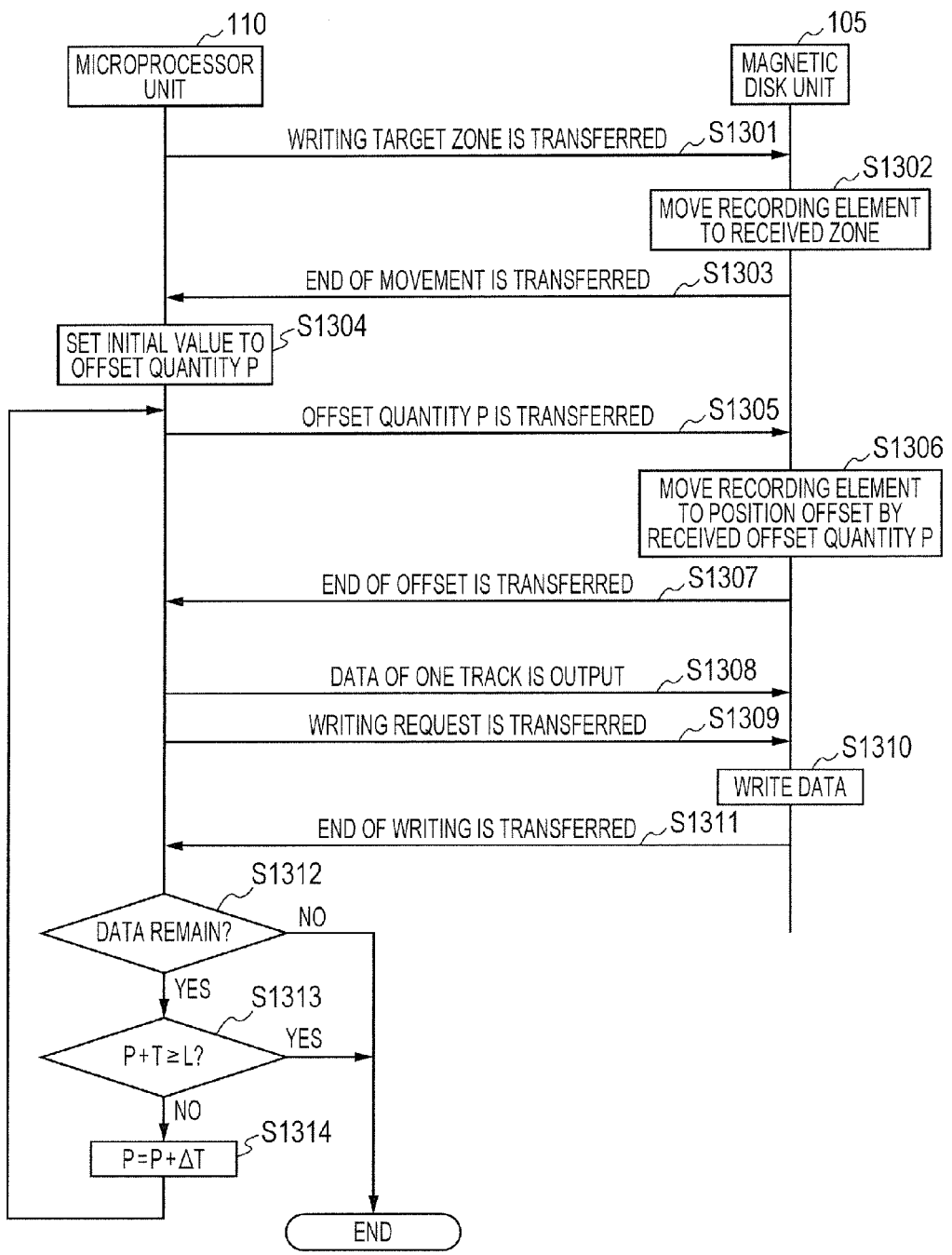
FIG. 13 is a flow chart for describing an operation of writing data in a second embodiment.

FIG. 13 is a flow chart for describing an operation of performing data writing to the zone in the second embodiment.

In FIG. 13, when performing the data writing, the zone for the data writing (i.e., the writing target zone) is first transferred from the microprocessor unit 110 to the magnetic disk unit 105, so that the writing target zone is designated (S1301).

If the zone designation is received from the microprocessor unit 110, the magnetic disk unit 105 moves the recording element 41 to the designated zone (S1302), and transfers a notification indicating that the movement was ended to the microprocessor unit 110 (S1303).

Then, if the transferred notification indicating that the movement of the recording element 41 was ended is received, the microprocessor unit 110 sets an initial value as the offset quantity P to the designated zone (S1304), and transfers the offset quantity P to the magnetic disk unit 105 (S1305).

If the offset quantity P is received, the magnetic disk unit 105 moves the recording element 41 to the position offset by the designated offset quantity P in regard to the designated zone (S1306), and then transfers a notification indicating that the offset was ended to the microprocessor unit 110 (S1307).

If the notification indicating that the offset of the recording element 41 was ended is received, the microprocessor unit 110 transfers the data of one track to be written to the offset position P in the predetermined zone (S1308), and then transfers a writing request (S1309).

If the writing request is received, the magnetic disk unit 105 writes the data received in S1308 to the position offset by the value designated in S1305, in regard to the zone designated in S1301 (S1310).

If the data writing is ended, the magnetic disk unit 105 transfers a notification indicating that the data writing was ended to the microprocessor unit 110 (S1311).

If the notification indicating that the data writing was ended is received, the microprocessor unit 110 decides whether or not the data to be written to the zone designated in S1301 still remains (S1312). If it is decided that the data to be written does not remain, the data writing is ended.

On the other hand, if it is decided that the data to be written still remains, it is further decided whether or not the data can be written in the zone (S1313).

In S1313, if the value of P+T (i.e., the width of the portion in which the data have been written until then, in the zone) is equal to or larger than the width L of the zone, it is decided that the data cannot be written anymore in the relevant zone, and the data writing to the relevant zone is ended.

On the other hand, if the value of P+T is smaller the width L, the value obtained by adding ΔT to the value of the offset quantity P of the recording element is set (S1314), and the offset quantity P is transferred to the magnetic disk unit 105 in S1305, thereby preparing next data writing. After then, the data writing is performed until it is decided in S1312 that the data to be written does not remain or it is decided in S1313 that the area to which the data can be written does not exist.

By the above operation, the data writing to the predetermined zone is performed by the shingle recording method as described in FIGS. 4 to 6.

Figure 14:
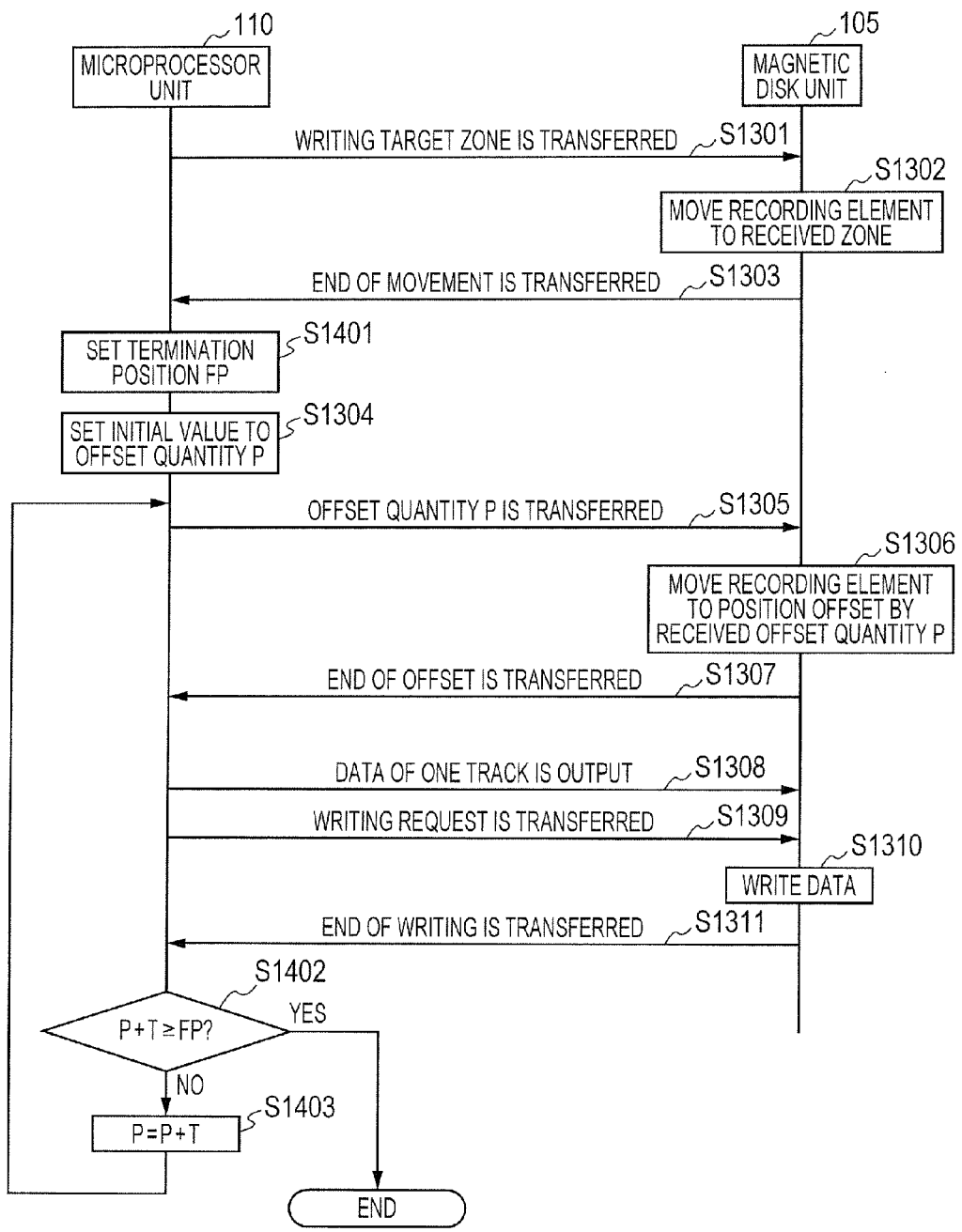
FIG. 14 is a flow chart for describing an operation of deleting data in the second embodiment.

FIG. 14 is a flow chart for describing an operation of performing data deletion to the zone in the second embodiment. Hereinafter, only the portions different from those in the flow chart of FIG. 13 will be described.

If the notification indicating that the movement of the recording element 41 to the designated zone was ended is received in S1303, the microprocessor unit 110 calculates the termination position of the data to be deleted in the zone designated in S1301, and sets the calculated data termination position to the variable FP (S1401).

After the data termination position was set to the variable FP in S1401, an initial value is set to the offset quantity P in S1304.

The data of one track to be transferred from the microprocessor unit 110 to the magnetic disk unit 105 in S1308 is the meaningless data for overwriting the data recorded on the magnetic recording medium 50.

If the notification indicating that the data writing of one track was ended is received from the magnetic disk unit 105 in S1311, the microprocessor unit 110 decides whether or not the data to be deleted still remains in the zone designated in S1301 (S1402).

In S1402, the decision is performed based on whether or not the area in which the data was written to the zone is equal to or larger than the value of FP set in S1401.

In FIG. 14, the decision is performed by comparing the value obtained by adding the offset quantity P of the recording element 41 and the width T of the recording element together with the deletion data termination position FP. That is, if the value of P+T (i.e., the value indicating the position of the edge of the area for which the data deletion was performed, in the certain zone) is equal to or larger than the value of FP, it is decided that the data deletion to the relevant zone was ended, and the data writing is ended.

If it is decided in S1402 that the value of P+T is smaller than the value of FP, the value obtained by adding the value of the offset quantity P of the recording element 41 and the width T of the track to which the data writing was performed together is set (S1403), thereby preparing next data writing.

After then, the data writing is performed until it is decided in S1402 that the value of P+T becomes equal to or larger than the value of FP (i.e., the data to be deleted in the zone becomes zero).

By the above operation, as well as the first embodiment described in FIGS. 11A to 12C, it is possible to reduce the number of times of the data writing for data deletion to the predetermined zone, and it is thus possible to shorten a time necessary for the data deletion.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-088139, filed Apr. 22, 2014, which is hereby incorporated by reference herein in its entirety.

The invention claimed is:

1. A magnetic recording apparatus comprising:
a writing unit configured to form a recording column extending in a first direction, by applying a recording magnetic field to a recording medium;
a moving unit configured to move a relative position of the recording medium and the writing unit to a second direction perpendicular to the first direction; and
a controlling unit configured to control the writing unit and the moving unit such that, on the recording medium, the recording columns mutually adjacent in regard to the second direction partially overlap in the second direction,
wherein the controlling unit controls the moving unit such that a quantity of movement in the second direction in a case of deleting information written on the recording medium by overwriting with the writing unit another information on the recording column in which the information has been written is larger than a quantity of movement in the second direction in a case of writing information on the recording medium with the writing unit, and
wherein the writing unit, the moving unit, and the controlling unit are implemented by at least one circuit.

2. The magnetic recording apparatus according to claim 1, wherein the controlling unit controls the moving unit such that, in the case of writing information with the writing unit, the quantity of the movement in the second direction when deleting information is equal to or smaller than a length T of the recording column in the second direction formed on the recording medium.

3. The magnetic recording apparatus according to claim 1, wherein, the controlling unit raises a magnetic force of the recording magnetic field applied to the recording medium when deleting information as compared with a magnetic force applied when writing information.

4. A magnetic recording method comprising steps of:
writing, with a writing unit, a recording column extending in a first direction, by applying a recording magnetic field to a recording medium;
moving a relative position of the recording medium and the writing unit to a second direction perpendicular to the first direction; and
controlling the writing step and the moving step such that, on the recording medium, the recording columns mutually adjacent in regard to the second direction partially overlap in the second direction,
wherein, in the controlling step, the moving step is controlled such that a quantity of movement in the second direction in a case of deleting information written on the recording medium by overwriting another information on the recording column in which the information to be deleted has been written is larger than a quantity of movement in the second direction in a case of writing information on the recording medium in the writing step, and
wherein the writing step, the moving step, and the controlling step are performed by a single circuit or separate circuits.

5. The magnetic recording method according to claim 4, wherein, in the controlling step, the moving step is controlled such that, in the case of writing information in the writing step, the quantity of the movement in the second direction when deleting information is equal to or smaller than a length T of the recording column in the second direction formed on the recording medium.

6. The magnetic recording method according to claim 4, wherein, in the case of writing information in the writing step, a controller raises a magnetic force of the recording magnetic field applied to the recording medium when deleting information as compared with a magnetic force applied when writing information.

7. A non-transitory computer-readable storage medium storing a program for causing a computer to perform a magnetic recording method, the method comprising steps of:
writing, with a writing unit, a recording column extending in a first direction, by applying a recording magnetic field to a recording medium;
moving a relative position of the recording medium and the writing unit to a second direction perpendicular to the first direction; and
controlling the writing step and the moving step such that, on the recording medium, the recording columns mutually adjacent in regard to the second direction partially overlap in the second direction,
wherein, in the controlling step, the moving step is controlled such that a quantity of movement in the second direction in a case of deleting information written on the recording medium by overwriting another information on the recording column in which the information to be deleted has been written is larger than a quantity of movement in the second direction in a case of writing information on the recording medium in the writing step, and
wherein the writing step, the moving step, and the controlling step are performed by a single circuit or separate circuits.

* * * * *